United States Patent [19]

Cullingford et al.

[11] Patent Number: 4,683,746
[45] Date of Patent: Aug. 4, 1987

[54] TORQUE MONITORING

[75] Inventors: Christopher V. Cullingford, Inkberrow; John S. Forrester, Halesowen; Gerald B. Smith, Sheldon, all of United Kingdom

[73] Assignee: Lucas Electrical Electronics and Systems Limited, England

[21] Appl. No.: 821,392

[22] Filed: Jan. 22, 1986

[30] Foreign Application Priority Data

Feb. 2, 1985 [GB] United Kingdom ................. 8502695

[51] Int. Cl.⁴ ........................................... G01M 15/00
[52] U.S. Cl. ................................. 73/118.1; 73/862.34
[58] Field of Search ............ 73/118.1, 862.19, 862.27, 73/862.32, 862.33, 862.34; 192/30 V, 30 W, 106.2

[56] References Cited

U.S. PATENT DOCUMENTS 4,513,626 2/1985 Obayashi et al. ................. 73/862.34

FOREIGN PATENT DOCUMENTS 1053794 3/1959 Fed. Rep. of Germany ... 192/30 W

*Primary Examiner*—Jerry W. Myracle
*Attorney, Agent, or Firm*—Andrus, Sceales, Starke & Sawall

[57] ABSTRACT

A method of monitoring torque in a drive transmission incorporating a friction clutch assembly having a two part rotatable drive transmitting member the two parts of which are relatively movable against the action of damper springs comprising monitoring the extent of the relative movement of said two parts (16, 17) of said drive transmitting member. The invention also resides in a friction clutch assembly having a two part, rotatable, drive transmitting member, the two parts being movable relative to one another against the action of damper springs, the clutch including a plurality of angularly spaced reference teeth on each part of said two part member respectively and a sensor relative to which said two part member rotates, said sensor monitoring said teeth and in use producing, at a plurality of points in each revolution of the two part member, an output representative of the relative positions of said parts of said two part member.

12 Claims, 11 Drawing Figures

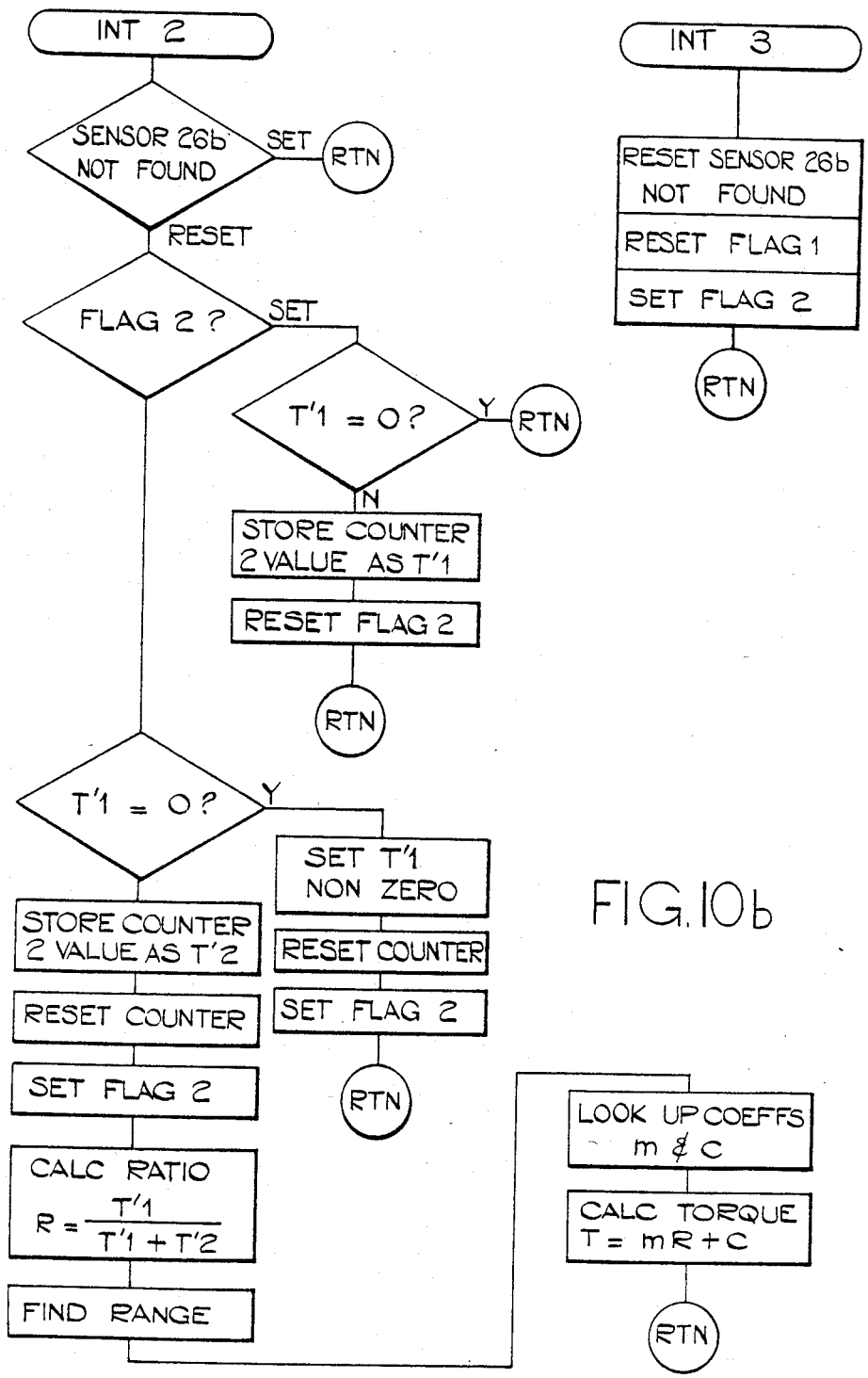

TORQUE MONITORING

This invention relates to a method of monitoring torque in a drive transmission incorporating a friction clutch having damper springs, and further relates to a friction clutch for use in such monitoring, and a torque monitoring system utilizing the clutch.

It is desirable to be able to monitor the torque in the engine/transmission system of, for example, a road vehicle inter alia in order that the information obtained can be utilised in conjunction with other relevant information derived from the engine/transmission system, to effect control over the operation of the engine and/or the transmission. Examples of applications where such information is needed are electronically controlled transmission systems and the so called "self adaptive engine management systems".

It has previously been proposed to monitor torque in an engine/transmission system by utilizing strain gauges to monitor the stresses in certain shafts of the system, for example the engine crank-shaft. It has also been proposed to use photo-electric techniques or Hall Effect devices or inductive techniques to monitor twisting motions of such shafts, or to monitor torsional stresses in such shafts using magnetostrictive techniques. Although these prior proposals are theoretically acceptable it is found in practice that they are disadvantageous in that in order to achieve reliable results complex and expensive transducers and/or signal processing apparatus is needed. It has also been proposed to incorporate torque measuring apparatus in a drive transmission system, but this proposal is disadvantageous in that substantial modification of the standard form of transmission system is necessary in order to accommodate the apparatus. Additionally of course such torque measuring apparatus is expensive.

It is an object of the present invention to effect torque monitoring in a manner whereby the above disadvantages are minimised.

According to a first aspect of the present invention, in a drive transmission incorporating a friction clutch assembly having a two part rotatable drive transmitting member, the two parts of which are relatively movable against the action of damper spring means, a method of monitoring torque in the transmission comprises monitoring the extent of the relative movement of said two parts of said drive transmitting member.

It is to be understood that the distance through which one of said two parts of said drive transmitting member moves, against the action of the damper spring means, relative to the other of said parts is directly proportional to the torque being transmitted by said two part member.

Preferably the relative movement of said parts is monitored remotely by sensor means relative to which said two part member rotates.

According to a second aspect of the present invention there is provided a friction clutch assembly having a two part, rotatable, drive transmitting member, the two parts of said member being movable relative to one another against the action of damper spring means, the clutch further including a plurality of angularly spaced reference means on each of said parts of said two part member respectively and sensor means relative to which said two parts member rotates, said sensor means monitoring said reference means and in use producing, at a plurality of points in each revolution of the two part member, an output representative of the relative positions of said parts of said two part member.

Preferably the angular spacing of said reference means within each plurality of reference means is a generally equiangular spacing.

Desirably said plurality reference means comprises a first plurality of elements carried by one part of said two part member and generally equiangularly spaced around the axis of rotation of said two part member, and, a second equal plurality of elements carried by the other part of said two part member and generally equiangularly spaced around the axis of rotation of said two part member, the elements of said first plurality and the elements of said second plurality being so positioned on their respective parts that their orbits of movement are close to one another.

Preferably said elements of said first plurality are interdigitated with the elements of said second plurality.

Preferably there is provided a second sensor also monitoring said reference means and in use producing an output representative of the relative positions of said parts of said two part member, said second sensor being angularly spaced about the axis of rotation of said member from the first sensor so as to produce an output between successive outputs of the first sensor. Desirably said second sensor is spaced angularly from said first sensor by an angular distance equal to half of the angular distance between adjacent reference means of said first plurality of reference means or by an odd number multiple thereof.

The assembly may be provided with a third or more further sensor.

Preferably there is provided means for producing a datum signal at the same point in each revolution of the first part of said two part member.

Conveniently said means comprises a further sensor and a datum means rotatable with said two part member adjacent said further sensor.

Preferably said means comprises a sensor monitoring said reference means and a selected one of said reference means which has been arranged to cause the sensor to produce an output which is distinct from the output produced by the other reference means.

Desirably the clutch is a diaphragm clutch and said sensor or sensors monitoring said reference means are carried by the stationary clutch release bearing guide sleeve of the clutch, said sensor or sensors being positioned between the inner face of the diaphragm spring and the driven plate of the clutch.

The invention further resides in a torque monitoring system comprising a friction clutch as specified above and an associated microprocessor for processing the output of the or each sensor.

An example of the present invention is illustrated in the accompanying drawings wherein;

FIG. 9 is a diagrammatic representation of a modified arrangement and FIGS. 10a and 10b are flow diagrams related to the arrangement of FIG. 9.

Figure 1:
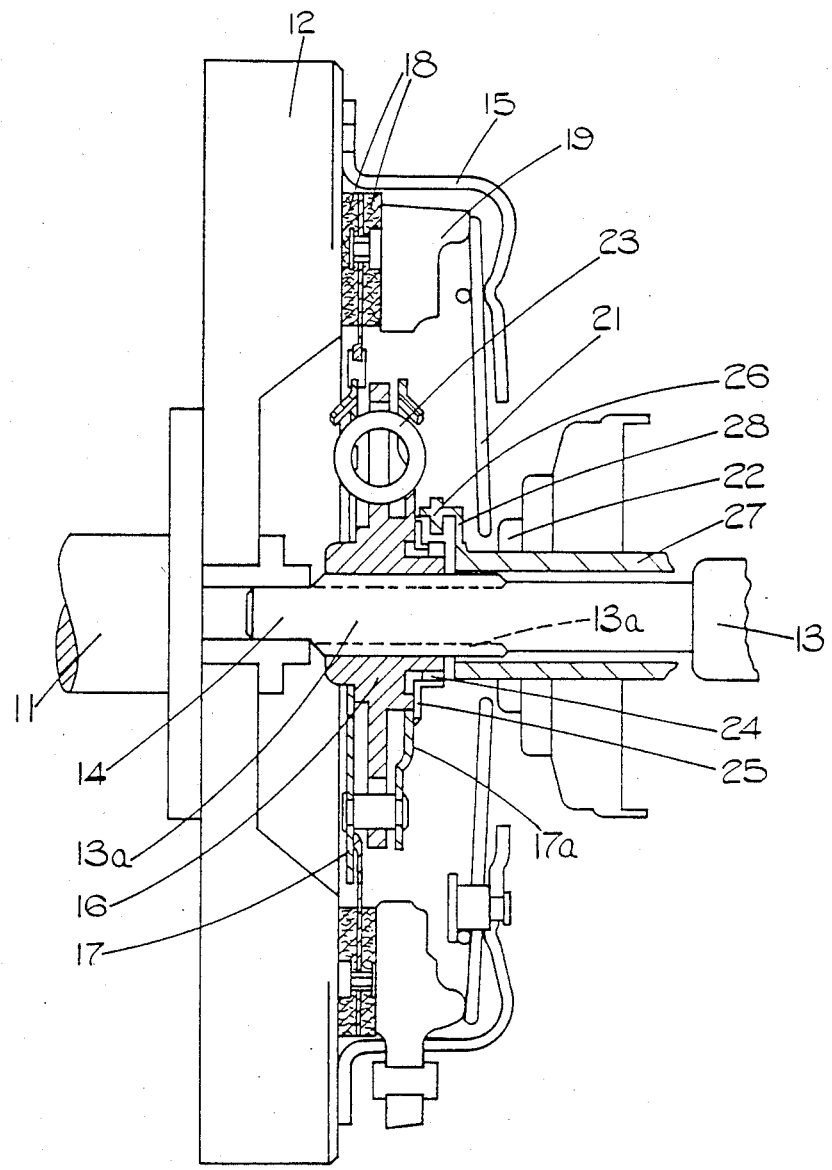
FIG. 1 is a transverse sectional view of a dry plate friction clutch.
Figure 2:
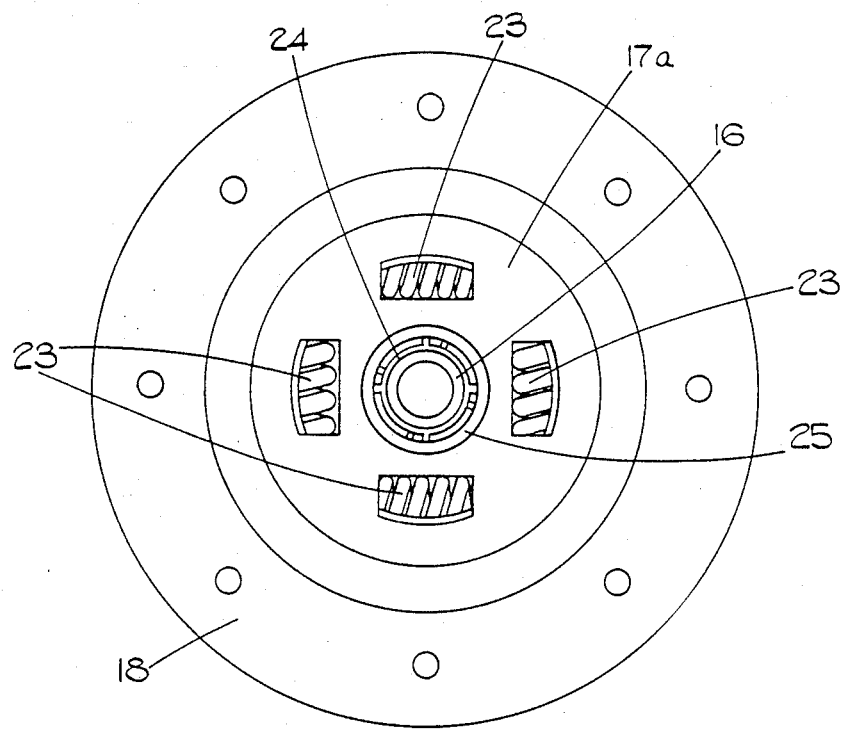
FIG. 2 is a plan view of the driven plate assembly of the clutch of FIG. 1, to a reduced scale.

Referring to the drawings, the clutch which is illustrated is a dry plate friction clutch of the kind known as a diaphragm clutch and its construction and operation as a clutch will be well understood by those familiar with clutches. Briefly, the clutch is interposed in the drive transmission system between the engine and the gear-box and is operable, when engaged, to transmit drive from the engine to the gear-box, and is operable when disengaged, to disconnect the engine from the gear- box. The engine and gear-box can be of completely conventional form, the output from the engine being by way of the engine crank-shaft 11, and the fly-wheel 12 which rotates with the crank-shaft 11 being secured thereto. Drive is transmitted into the gear-box by a shaft 13 one end 14 of which is journalled for rotation in, and co-axial with, the fly-wheel 12.

Secured to the fly-wheel 12 adjacent its a pressed steel clutch cover 15. Within the cover 15 the shaft 13 is formed, adjacent its end 14, with an axially splined region 13a upon which is mounted an internally splined hub 16 of the driven plate of the clutch. The driven plate of the clutch further includes an annular component 17 mounted on the hub 16 for limited rotational movement about the axis of the hub 16. The component 17 carries at its periphery, oppositely presented annular friction members 18.

An annular pressure plate 19 is normally urged by a diaphragm spring 21 towards the fly-wheel 12 thus trapping the friction members 18 between the face of the fly-wheel and a mutually presented face of the pressure plate 19. As is well known the clutch can be released by movement of a release bearing 22 axially towards the fly-wheel along the shaft 13, the release bearing 22 flexing the diaphragm spring 21 to release the pressure plate 19 and thus permit the pressure plate 19 and fly-wheel 12 to rotate relative to the friction members 18.

The construction of the driven plate is generally conventional in that the limited rotational movement of the annular member 17 on the hub 16 is opposed, irrespective of the direction of the relative rotational movement, by four equiangularly spaced circumferentially extending damper springs 23. It is usual for one pair, generally a diametrically opposed pair, of damper springs to be more highly rated than the other pair thereby providing a "knee-type" characteristic. As is well understood the damper springs 23 are provided in order to permit limited relative rotation between the annular component 17 and the hub 16 thereby minimising transmission of snatch and shock loadings through the clutch. It will be appreciated that the proportionality between the torque and damper spring movement is retained over the full clutch characteristic. However, the constant of proportionality will depend upon which side of the "knee" of the characteristic the clutch is operating.

The arrangement so far describe is totally conventional, drive being transmitted from the flywheel 12 and the pressure plate 19 which rotates therewith, by way of the friction members 18 the annular component 17 and the damper springs 23 to the hub 16 which in turn transmits drive to the shaft 13 by way of the splined connection of the hub with the shaft 13.

Figure 3:
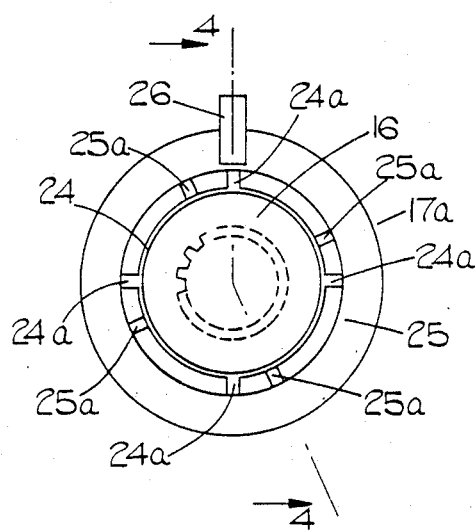
FIG. 3 is an enlargement of part of the clutch illustrated in FIGS. 1 and 2.
Figure 4:
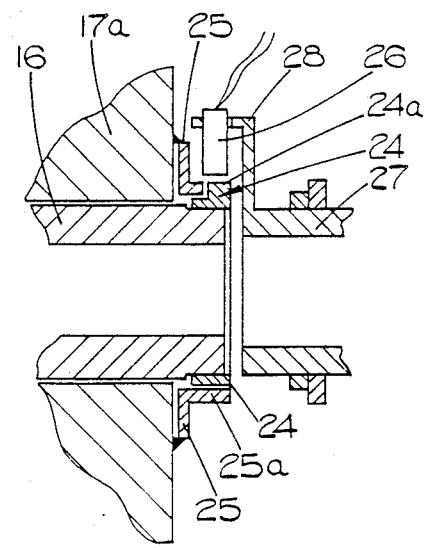
FIG. 4 is a sectional view on the line 4—4 in FIG. 3.

The inventors have recognised that the torque transmitted by the driven plate of the clutch can be monitored by monitoring the relative positions of the annular component 17 and the hub 16. In order to effect such monitoring the hub, and a plate 17a of the annular component 17 at the face of the driven plate remote from the fly-wheel 12, are both provided with toothed rings 24, and 25 respectively. The rings 24, 25 have their axes coincident with the axis of the hub, and each ring carries four equiangularly spaced teeth indicated in the drawings by the suffix a (best seen in FIG. 3).

The teeth 24a of the ring 24 extend radially outwardly from the ring whereas the teeth 25a of the ring 25 extend axially. The axially extending teeth 25a pass between the radially extending teeth 24a and thus although the rings 24, 25 are axially spaced by a small distance their teeth are "interdigitated" and can share a common path of revolution as the driven plate of the clutch rotates.

In order to monitor the relative positions of the teeth 24a, 25a there is provided a sensor 26. The aforementioned clutch release bearing 22 which is slidable axially relative to the shaft 13 is slidable on a stationary clutch release bearing guide sleeve 27 through which the shaft 13 extends. The sleeve 27 is provided with an extension 28 upon which the sensor 26 is mounted. The sensor 26 is position radially outwardly from, and axially aligned with, the teeth 24a, 25a and since the sleeve 27 is stationary the making of electrical connections to the sensor 26 is a relatively simple matter.

It will be recognized that the teeth 24a, 25a constitute reference points to be monitored by a sensor. It is preferred that the rings 24, 25 and their respective teeth are ferromagnetic and that the sensor 26 is a variable reluctance sensor. It is to be understood however that other monitoring arrangements could be provided, for example the sensor could be an optical sensor monitoring reference marks on the hub 16 and components 17. Such an arrangement might however prove disadvantageous in view of the relatively dirty environment.

It will be recognised that the extent of the relative angular movement of the teeth 24a, 25a is directly proportional to the torque being transmitted by the driven plate of the clutch and since there are four pairs of teeth the torque can be monitored four times during each revolution of the driven plate. The passage of the teeth across the face of the sensor 26 generates a train of electrical pulses which can be processed by relatively simple circuitry to produce a square wave-form the mark/space ratio of which at any given instant will be proportional to the torque being transmitted at that instant. Thus the mark/space ratio of the wave-form will vary in proportion to the applied torque. After further processing the information, conveyed by the wave-form can be applied together with other engine and transmission control parameters to, for example, a self adaptive engine management system or to an electronically controlled transmission system. It will be recognised that since the springs 23 urge the hub 16 and components 17 to a central rest position from which relative movement can take place in either direction against the action of the springs, then both positive and negative torque in relation to the central rest position can be monitored. The incorporation of the toothed rings and the sensor into the clutch requires only a relatively minor and simple modification to the clutch construction, and is therefore relatively simple cheap and convenient to effect. Moreover, generally it will be possible to incorporate the components without increasing the overall dimensions of the clutch, and therefore without increasing the overall dimensions of the engine/transmission system.

The passage of each tooth beneath the sensor may produce a pulse of the same magnitude, or alternatively the teeth can be arranged so that the teeth 24a of the hub 16, which can be considered to be fixed teeth, produce a pulse of greater amplitude than the teeth 25a, which can be considered to be movable teeth, that is to say teeth which are movable relative to the fixed teeth 24a.

Figure 5:
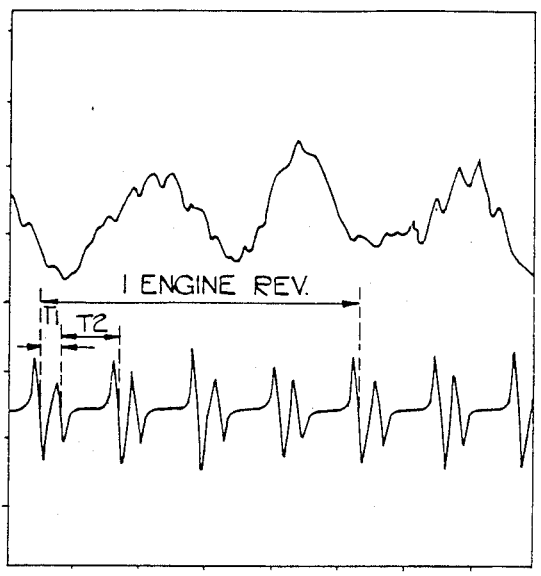
FIGS. 5, 6, 7 and 8 are graphical representations of the operation of monitoring torque in the assembly illustrated in FIGS. 1 to 4 and modifications thereof.

FIG. 5 shows, in its upper and lower curves, the variation of different parameters in the same period of operation of an in-line four cylinder, four stroke internal combustion engine having a torque monitoring arrangement as illustrated in FIGS. 1 to 4. The upper curve illustrates torque fluctuations occuring in approximately 1.5 revolutions, and the lower curve represents the pulse train, during the equivalent time period, issuing from the sensor 26. The period of one engine revolution is indicated in FIG. 5, and it will be understood that during each engine revolution two of the four cylinders will fire. Considering the lower curve of FIG. 5 it can be seen that the train of pulses includes a large amplitude pulse representative of a fixed tooth passing the sensor and followed by a pulse of lower amplitude presenting a movable tooth passing the sensor. During the period of one engine revolution it can be seen that there are four equally spaced large amplitude pulses, and these are of course associated with the four equiangularly spaced fixed teeth. During the same period there are of course two torque cycles resulting from the two cylinder firing and thus during each torque cycle two fixed, and associated movable teeth will pass the sensor. Within each torque cycle therefore the torque can be monitored twice and an average torque can be computed.

Figure 6:
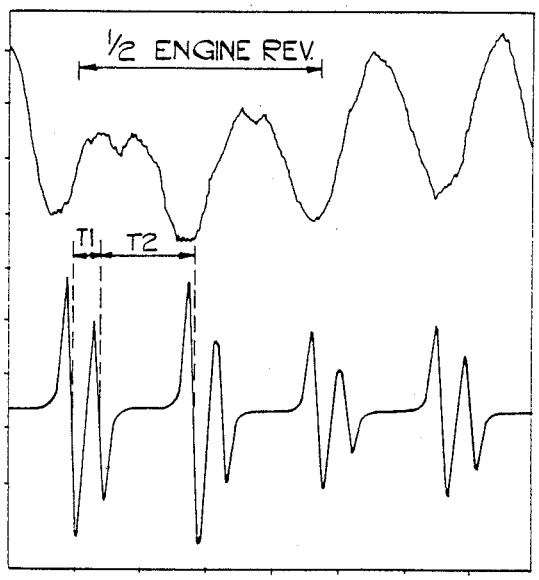

FIG. 6 is similar to FIG. 5 except that it is of an enlarged scale, and it can be seen that in FIG. 6 the period of 0.5 an engine revolution occupies almost as much width as a complete engine revolution in FIG. 5. FIG. 6 illustrates a problem which can be encountered with the relatively simple torque monitoring arrangement described above in relation to FIGS. 1 to 5. It is found that when the engine is running at substantially constant speed the engine can become synchronized with a resonance at twice the firing frequency, and the resultant torque cycle wave-form can achieve a constant phase relationship with rotation of the crank-shaft such that the passage of each fixed tooth beneath the sensor 26 corresponds to the same point in the repeating torque cycle. Thus an anomalous indication of the torque can be produced since it may be that the torque is monitored by each pair of fixed movable teeth at, for example, the point in the torque cycle at which the torque is at a maximum, or equally at a point in the cycle at which the torque is at a minimum. The computed average would, in these two cases, be totally unrealistic since in one case the computed average would equal the maximum torque occuring at any point in the cycle, and in the other case the computed average would equal the minimum torque which occurs at any point in the cycle.

Figure 7:
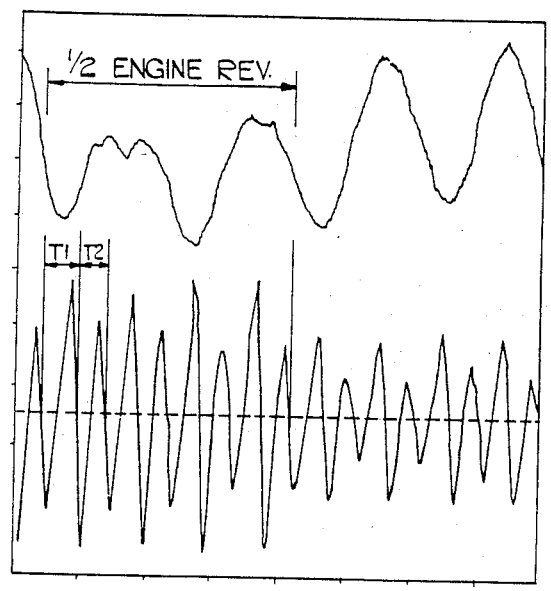

One way in which this problem can be minimized is to increase the number of pairs of fixed and movable teeth in the monitoring arrangement. FIG. 7 is a view similar to FIG. 6 but shows a pulse train derived from a sensor 26 monitoring eight, rather than, four pairs of fixed and movable teeth. Thus the number of times within an engine revolution during which the torque is monitored has been doubled by doubling the number of teeth and thus notwithstanding the problem described in relation to FIG. 6 there is a much increased chance that the computed average torque will be a realistic figure. There are of course difficulties encountered in increasing the number of teeth. Firstly there are physical limitations as to the number of interdigitated teeth which can be accommodated without increasing the size of the clutch. Furthermore the pulses produced by the teeth passing the sensor are not instantaneous, and have a finite time period between growth from zero to maximum amplitude, and then decay through zero to minimum amplitude. If the teeth are crowded too closely together then there is a danger that the leading edge of a subsequent pulse will interfere with the trailing edge of the previous pulse and the sensor will not be able to discriminate between the adjacent teeth. As will be mentioned later it is desirable to arrange the associated electronics to react to the zero crossing points of the pulses and not to the peaks.

Figure 8:
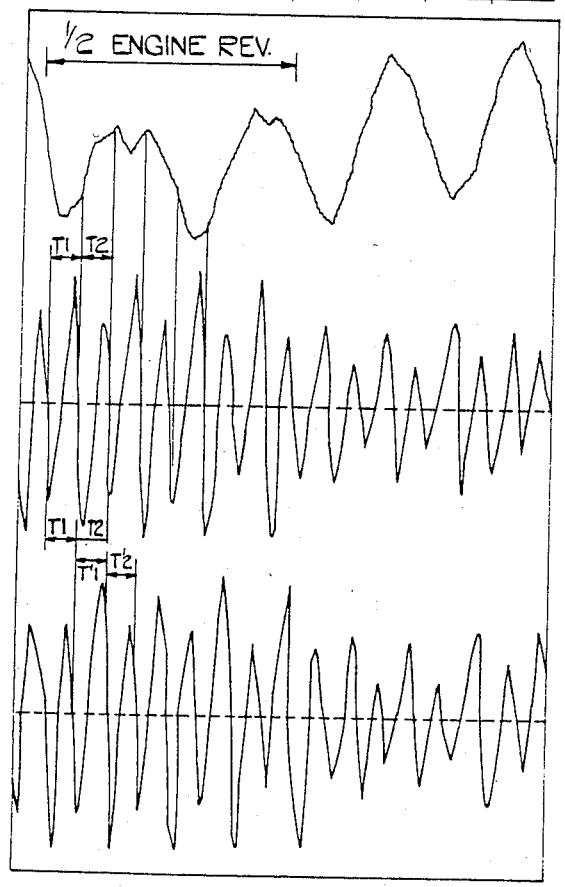

An alternative method of achieving greater sensitivity is to increase the number of sensors. FIG. 8 is a view similar to FIG. 7, but illustrating an arrangement having eight pairs of fixed and movable teeth (as in FIG. 7) and also utilizing a second sensor (the lower of the three curves in FIG. 8).

The angular spacing of the second sensor from the first sensor around the axis of rotation of the teeth is determined by the angular spacing between adjacent fixed teeth. Thus where there are four fixed teeth they are spaced apart by 90° and the second sensor will thus be spaced from the first sensor by 45° (or $3\times45°$, $5\times45°$ etc) so that a fixed tooth passes the second sensor when the first sensor lies half way between adjacent fixed teeth. At the left hand side of FIG. 9 there is illustrated an arrangement utilizing eight pairs of teeth and in such an arrangement the second sensor will be spaced from the first sensor by $22\frac{1}{2}°$ (or $3\times22\frac{1}{2}°$, or $5\times22\frac{1}{2}°$, or $7\times22\frac{1}{2}°$). It will be recognized of course that more than one additional sensor can be provided if desired, but increasing the number of sensors also increases the mechanical and electronic complexity. As is clearly evident from FIG. 8 doubling the number of sensors monitoring the passage of teeth doubles the number of torque "measurements" within the given period of rotation of the engine. The combination of the lower two curves in FIG. 8 shows that by using eight pairs of teeth and two appropriately spaced sensors sixteen torque "measurements" can be achieved in each engine revolution. Increasing the "measurement frequency" ensures that the computed average torque will be accurate irrespective of problems of the kind described with reference to FIG. 6.

Figure 9:
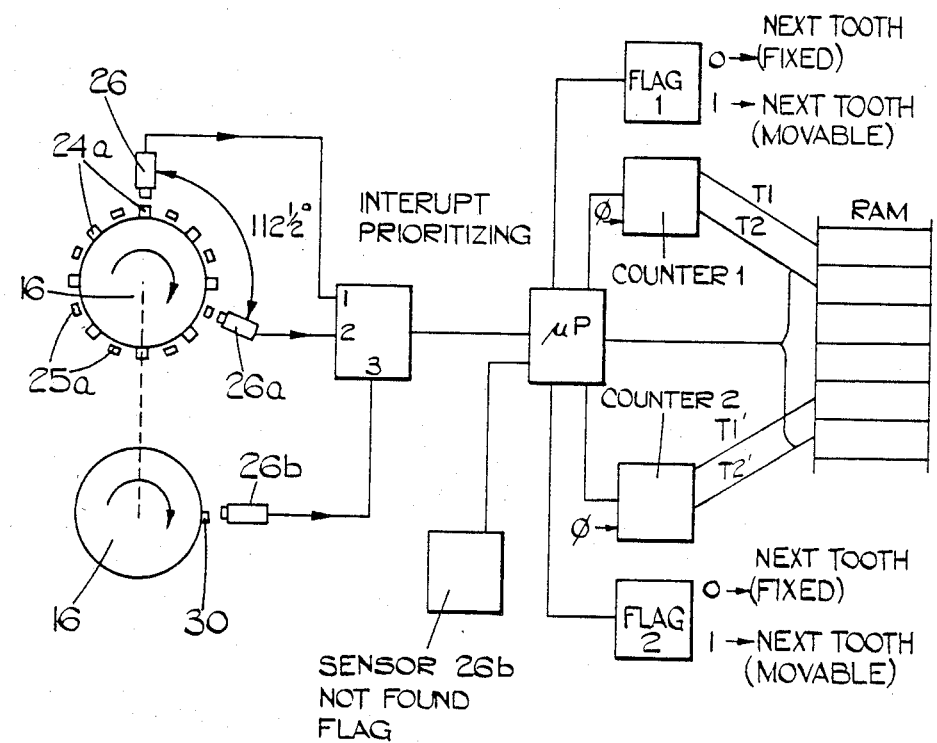

The interpretation of the train or trains of pulses from the sensor or sensors and the implementation of the information derived from train or trains of pulses will be performed by an appropriately programmed microprocessor. The nature of the microprocessor and its programming will of course be dependent upon the use to which the derived information is being put, and the pulses being acted upon by the electronic circuit will require a datum signal to be supplied to the microprocessor in order to assist the electronic circuit to discriminate between fixed and movable teeth. FIG. 9 illustrates, in addition to the second sensor 26a, a third sensor 26b. In FIG. 9 the sensor 26b is associated with a single tooth 30 rotating with the crank shaft of the engine. Thus passage of the tooth 30 adjacent the sensor 26b provides a datum pulse representing the start of an engine revolution and thus the microprocessors can recognise that the pulse following the datum is, for example, derived from a fixed tooth and will process the following signals accordingly. It will be recognized however, that in order to avoid undue mechanical complexity, and in particular in order to avoid modification of the engine crank-shaft to provide the tooth 30 and the sensor 26b it is desirable to modify one of the fixed teeth 24a so that the chosen fixed tooth 24a, when passing adjacent the sensor 26, produces a pulse of significantly larger amplitude than the pulses produced by the other fixed and movable teeth. In the arrangement described above where the teeth are ferromagnetic this effect could be obtained by increasing the radial dimension of one of the fixed teeth 24a so that it passes in closer proximity to the sensor 26 than the remaining teeth.

Figure 10A:
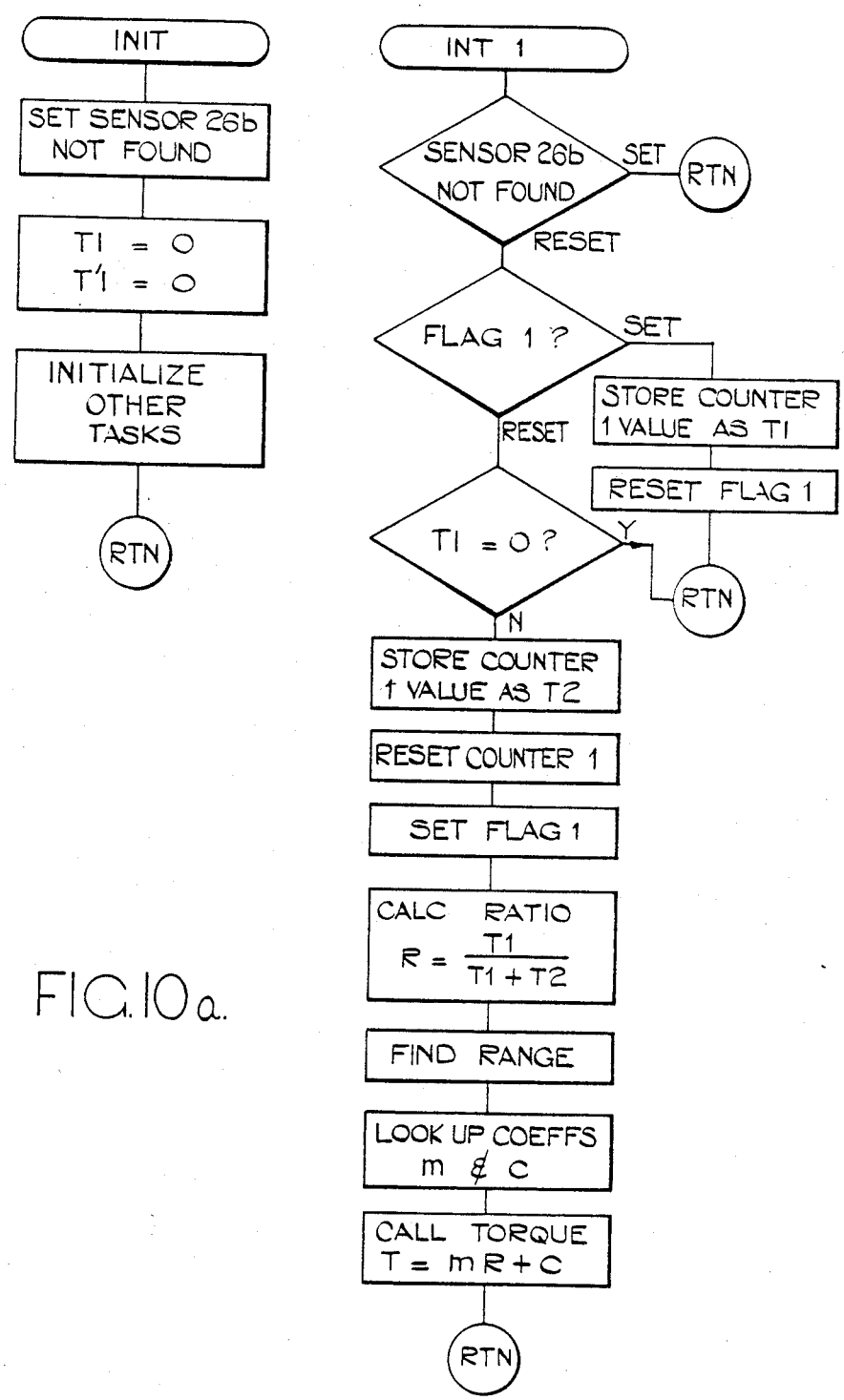

The right hand side of FIG. 9, and the flow diagram of FIG. 10 illustrate in general terms one example of a microprocessor arrangement for interpreting the pulse trains produced by the three sensors 26, 26a, 26b it being understood that in a practical arrangment it is probable that the result obtained from the sensor 26b in association with the tooth 30 will actually be obtained from the sensor 26 and an appropriately modified tooth 24a. In FIGS. 9 and 10 T1 relates to the spacing of a fixed tooth pulse from the subsequent movable tooth pulse, and references to T2 relate to the spacing of the movable tooth pulse from the next fixed tooth pulse, as seen by the sensor 26. Similarly references to T'1 and T'2 relate to the pulse spacing as seen by the sensor 26a. It will be noted that the spacings T1 and T2 are illustrated in FIGS. 5, 6, 7 and 8, and additionally FIG. 8 also illustrates the spacing T'1, T'2.

In addition to providing a datum point the tooth 30 and its associated sensor 26b (or the modified tooth and sensor 26) ensure that the counting of pulses which is performed by the microprocessor, commences with the pulse generated by a fixed, rather than a movable tooth. A still further benefit of establishing the datum is that it enables the system to be set-up to accommodate any manufacturing tolerances which may occur in the spacing of the fixed teeth and/or the spacing of the movable teeth. In the foregoing description it has been assumed that the accuracy of manufacture of the fixed teeth, the movable teeth and sensors will be such that the zero crossing points of the pulses produced by the fixed teeth are accurately equiangularly spaced and similarly that in a zero torque condition the pulses of the movable teeth would be equiangularly spaced. In practice this may not be the case, and it may for example be that owing to the manufacturing tolerances the zero crossing points of the pulses are not truely equiangularly spaced. However, once the teeth have been installed in the clutch the basic relationship between the zero crossing points of the pulses produced by the teeth will remain constant even if that relationship is not an equiangular spacing. Thus by establishing a datum, the datum can be related to the actual tooth positions (at zero torque) and the programming of the microprocessor can be chosen to accommodate the actual angular relationship of the zero crossing points of the pulses produced by the teeth. In other words, rather than assuming that the zero crossing points of the pulses produced by the teeth will be equiangularly spaced, each individual system can be set-up at the outset to accommodate the actual angular relationship which exists between the fixed teeth and between the movable teeth, and ultimately therefore a more accurate torque average can be calculated.

In a clutch having a "knee-type" characteristic as afforded for example by using damper springs of different rates as mentioned above, the electronic circuitry will need to recognise when the break or knee point has been reached so that it can accommodate the change in the constant of proportionality. This requirement is readily accommodated since the spacing between fixed and movable teeth is a measure of the relative positions of the parts 16, 17 and this of course will determine which of the damper springs is effective and thus which part of its characteristic the clutch is operating in.

It will be understood that the arrangement of teeth 24a, 25a and sensor 26 or sensors can be accommodated within the clutch with minimal changes to existing clutch design and construction.

We claim:

1. A friction clutch assembly having a two part, rotatable, drive transmitting member, the two parts of said member being movable relative to one another against the action of damper spring means, the clutch further including a plurality of angularly spaced reference means on each of said parts of said two part member respectively, and, first and second sensor means relative to which said two part member rotates, each of said first and second sensor means monitoring said reference means and in use producing, at a plurality of points in each revolution of the two part member, respective outputs representative of the relative positions of said parts of said two part member, said second sensor means being angularly spaced about the axis of rotation of said member from said first sensor means so as to produce an output between successive outputs of the first sensor means.

2. An assembly as claimed in claim 1 wherein the angular spacing of the reference means within each plurality of reference means is a generally equiangular spacing.

3. An assembly as claimed in claim 1 wherein said plurality of reference means comprises a first plurality of elements carried by one part of said two part member and generally equiangularly spaced around the axis of rotation of said two part member, and, a second equal plurality of elements carried by the other part of said two part member and generally equiangularly spaced around the axis of rotation of said two part member, the elements of said first plurality and the elements of said second plurality being so positioned on their respective parts that their orbits of movement are close to one another.

4. An assembly as claimed in claim 3 characterized in that said elements of said first plurality are interdigitated with the elements of said second plurality.

5. An assembly as claimed in claim 1 wherein said second sensor is spaced angularly from said first sensor by an angular distance equal to half of the angular distance between adjacent reference means of said first plurality of reference means or by an odd number multiple thereof.

6. An assembly as claimed in claim 1 wherein there is provided one or more further sensors.

7. An assembly as claimed in claim 1 wherein there is provided means for producing a datum signal at the same point in each revolution of the first part of said two part member.

8. An assembly as claimed in claim 7 wherein said means comprises a further sensor and a datum means rotatable with said two part member adjacent said further sensor.

9. An assembly as claimed in claim 7 wherein said means comprises a sensor monitoring said reference means and a selected one of said reference means which has been arranged to cause the sensor to produce an output which is distinct from the output produced by the other reference means.

10. A torque monitoring system in a drive transmission comprising a friction clutch assembly as claimed in claim 9 and an associated microprocessor for processing the output signals of the or each sensor.

11. An assembly as claimed in claim 1 wherein the clutch is a diaphragm clutch and said sensor or sensors monitoring said reference means are carried by the stationary clutch release bearing guide sleeve of the clutch, said sensor or sensors being positioned between the inner face of the diaphragm spring and the driven plate of the clutch.

12. A torque system in a drive transmission comprising a friction clutch assembly as claimed in claim 1 and an associated microprocessor for processing the output signals of the or each sensor.

* * * * *